(12) United States Patent
Horton et al.

(10) Patent No.: US 9,493,199 B2
(45) Date of Patent: Nov. 15, 2016

(54) MASTER LINK MATING SURFACE COVER

(71) Applicant: Caterpillar Inc., Peoria, IL (US)

(72) Inventors: Gerry L Horton, East Peoria, IL (US);
Dennis Roberts, Metamora, IL (US);
Stan R. Parrott, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 10 days.

(21) Appl. No.: 14/509,105

(22) Filed: Oct. 8, 2014

(65) Prior Publication Data

US 2016/0101818 A1    Apr. 14, 2016

(51) Int. Cl.
*F16G 13/06*    (2006.01)
*B62D 55/21*    (2006.01)

(52) U.S. Cl.
CPC .................................. *B62D 55/213* (2013.01)

(58) Field of Classification Search
CPC .................................................. B62D 55/213
USPC ............................................................. 305/186
See application file for complete search history.

(56) References Cited

U.S. PATENT DOCUMENTS

| | | | | |
|---|---|---|---|---|
| 2,883,242 A * | 4/1959 | Polinak | ................. | B62D 55/28 305/186 |
| 3,427,079 A * | 2/1969 | Maytum | ............... | B62D 55/213 305/186 |
| 3,822,923 A * | 7/1974 | Stedman | .............. | B62D 55/213 305/186 |
| 3,947,074 A * | 3/1976 | Nelson | ................... | B62D 55/28 305/190 |
| 4,159,857 A * | 7/1979 | Purcell | ................... | B62D 55/28 305/187 |
| 4,361,364 A * | 11/1982 | Brunn | ................. | B62D 55/213 305/186 |
| 4,457,565 A * | 7/1984 | Bissi | .................... | B62D 55/213 305/186 |
| 4,636,014 A * | 1/1987 | Dennison | ............ | B62D 55/213 305/186 |
| 4,775,198 A * | 10/1988 | Bokamp | ............... | B62D 55/21 305/186 |
| 6,390,943 B1 * | 5/2002 | Dreger | ................... | F16G 15/00 474/220 |
| 6,412,267 B2 * | 7/2002 | Duse | .................... | B62D 55/213 219/69.12 |
| 6,565,161 B2 * | 5/2003 | Anderton | ............ | B62D 55/092 305/103 |
| 7,100,353 B1 * | 9/2006 | Maguire | ................ | B21L 21/00 269/104 |
| 8,162,411 B2 * | 4/2012 | Sakai | .................... | B62D 55/21 305/198 |
| 8,272,701 B2 * | 9/2012 | Mulligan | .............. | B62D 55/21 305/186 |
| 2004/0032166 A1 * | 2/2004 | Maguire | ............. | B62D 55/213 305/186 |
| 2008/0174175 A1 * | 7/2008 | Livesay | .............. | B62D 55/213 305/186 |

(Continued)

*Primary Examiner* — Jeffrey J Restifo (57) ABSTRACT

A master link mating surface cover is disclosed. The master link mating surface cover includes a first inclined portion for covering a corresponding first inclined portion of a master link mating surface, a second inclined portion for covering a corresponding second inclined portion of a master link mating surface, and a third inclined portion for covering a corresponding third inclined portion of a master link mating surface.

13 Claims, 4 Drawing Sheets

(56) References Cited

U.S. PATENT DOCUMENTS

2012/0153715 A1* 6/2012 Tsubaki .............. B62D 55/092
305/186

* cited by examiner

FIG. 3

MASTER LINK MATING SURFACE COVER

TECHNICAL FIELD

The present disclosure relates generally to master links and more particularly to cover for a master link mating surface and a method of manufacturing a master link mating surface cover.

BACKGROUND

Track laying work machines utilize endless track chains to propel the work machines over the terrain during operation. For instance, endless track chains are used in crawler type vehicles, such as bulldozers or excavators. Endless track chains generally include a plurality of track chain links which are rotatably connected one after another. Ends of the track chain links are often removably connected to each other by master links. In operation, master links connect corresponding ends of the track chain links to each other and facilitate the breaking of the track chain to permit assembly and removal of the chain for repair and servicing. To this end, a master link typically includes two half links which are fitted to each other. Each half link has an assembly portion, and assembling the two half links includes engaging their assembly portions with each other and fastening the half links to each other using a coupler.

Track chain links as described above are typically shipped with the mating surface of one or more of the master link half links exposed to external handling damage, environmental factors, and paint processes. Prior to assembly, the mating surfaces are often cleaned or otherwise prepared, especially if damage or dirt is visible on the mating surface. Failure to properly clean and prepare the exposed master link mating surface may cause improper attachment and, in some instances premature failure.

U.S. Pat. No. 6,390,943 to Dreger, et al. implements a retainer subassembly for a master link of a chain including a cover plate, a pair of snap rings and a strap plate. Although the retainer subassembly disclosed by Dreger, et al. provides a cover plate, the cover plate is configured with a pair of spaced openings for receiving the free ends of the pair of pins of the master link. Therefore, the cover does not provide protection for the master link mating surface during transportation of the track chain.

The disclosed methods and systems are directed to solve one or more of the problems set forth above and/or other problems in the art.

SUMMARY OF THE INVENTION

In one aspect, a master link mating surface cover is provided. The master link mating surface cover includes a first inclined portion having a first upper flat surface terminating at a first end as a block. The first inclined portion substantially covers a corresponding first inclined region of a master link mating surface. The cover also includes a second inclined portion formed behind the first inclined portion having a second upper flat surface and an underside for receiving a corresponding master link teeth shaped portion. The underside portion includes first and second coupling hole inserts for frictionally coupling with one or more coupling holes of the corresponding master link. The cover may also include a third inclined portion formed behind the second inclined portion having a third upper flat surface and a toe portion for fitting around a corner portion of the corresponding master link.

In one aspect, a master link mating surface cover is provided. The master link mating surface cover includes a first inclined portion for covering a corresponding first inclined portion of a master link mating surface, a second inclined portion for covering a corresponding second inclined portion of a master link mating surface, and a third inclined portion for covering a corresponding third inclined portion of a master link mating surface.

In one aspect, a method is provided for manufacturing a master link mating surface cover. The method includes forming a first inclined portion, further including forming an upper block portion and forming first inclined portion curved regions, and forming a second inclined portion further including forming an underside contour region, wherein contours of an undulating underside portion are formed, forming one or more coupling hole inserts and forming two or more side skirt portions of the second inclined portion. The method further includes forming a third inclined portion, including forming a third inclined portion block region and forming a toe portion of the third inclined portion.

Other features and aspects of this disclosure will be apparent from the following description and the accompanying drawings.

BRIEF DESCRIPTION OF THE DRAWINGS

The accompanying drawings, which are incorporated in and constitute a part of this specification, illustrate several aspects of the disclosure and together with the description, serve to explain the principles of the disclosure. In the drawings.

DETAILED DESCRIPTION

Reference will now be made in detail to aspects of the disclosure, examples of which are illustrated in the accompanying drawings. Wherever possible, the same reference numbers will be used throughout the drawings to refer to the same or like parts or elements.

Figure 1:
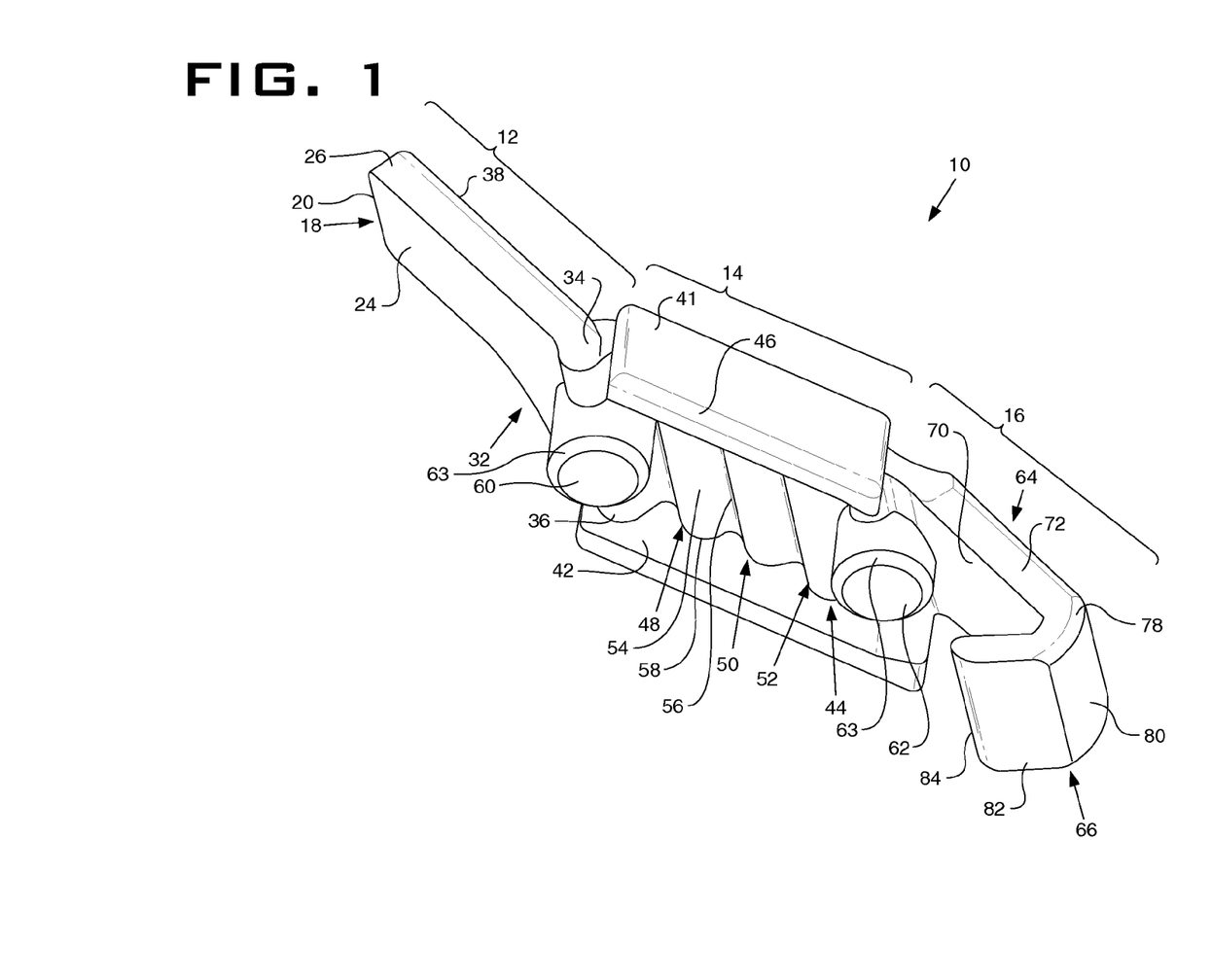
FIG. 1 illustrates a bottom isometric view of a master link mating surface cover according to embodiments of the present disclosure.
Figure 2A:
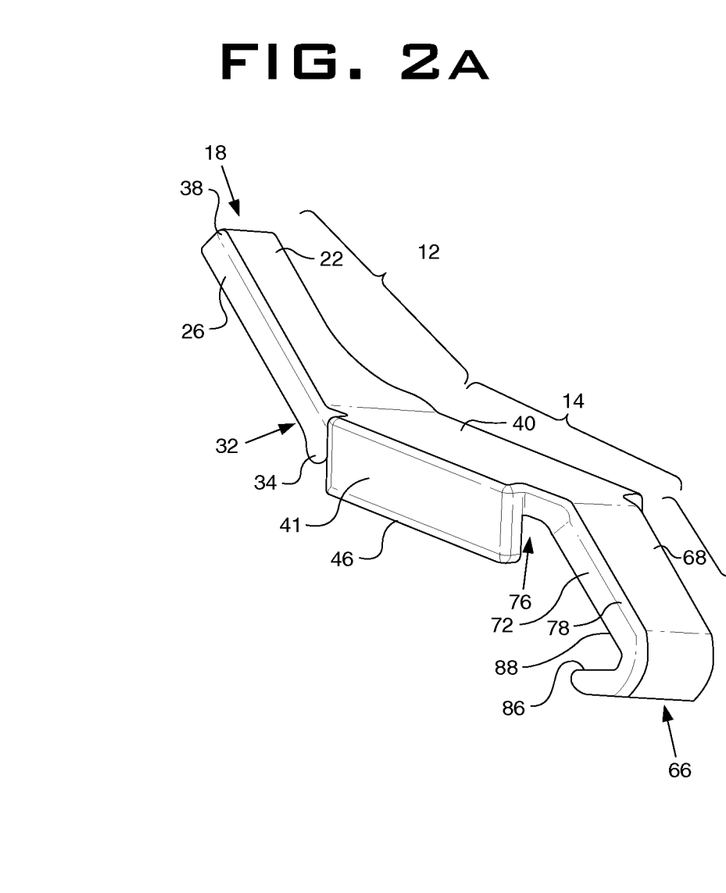
FIG. 2A illustrates a top isometric view of a master link mating surface cover according to embodiments of the present disclosure.
Figure 2B:
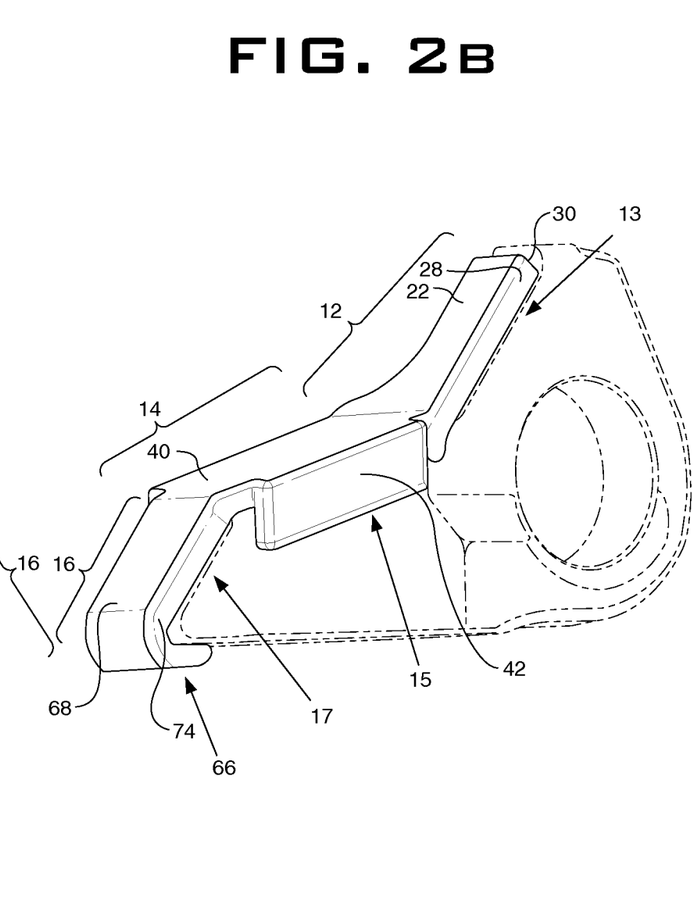
FIG. 2B illustrates a top isometric view of a master link mating surface cover in use with a master link half link according to embodiments of the present disclosure.

FIGS. 1, 2A, and 2B illustrate top and bottom isometric views of a master link mating surface cover 10 (hereinafter also referred to as cover 10) according to embodiments of the present disclosure. Typically, a master link joint may include two "half links" that are coupled together by the threaded fasteners. FIG. 2B illustrates an example of a half link with the mating surface covered by master link mating surface cover 10. It is with this general master link configuration and the described engaging surfaces of a half link that the master link mating surface cover 10 is contemplated. Accordingly, as used herein, the master link mating surface refers to the surface of master link half link that engages with another half link and that may be exposed during transportation. As used herein, either half link of a master link assembly may also be referred to as a "master link."

In embodiments, the master link mating surface cover 10 may be configured to mate with a corresponding master link mating surface by substantially contacting or covering the surface of the master link mating surface. In some aspects, the cover 10 may extend essentially the length of the master link mating surface and may include a plurality of discreet regions configured to frictionally engage with and/or cover 10 different aspects of the master link mating surface. To this end, the cover 10 may include a first inclined portion 12, a second inclined portion 14 and a third inclined portion 16.

The first inclined portion 12 may be configured to substantially cover a top surface of a corresponding first inclined portion 13 of the master link mating surface. As can be seen in FIG. 2B, the first inclined portion may slope accordingly to conform to the shape of a first inclined portion 13 of the master link mating surface. The first inclined portion 12 further include a first block region 18 terminating at a first distal end 20 of the cover 10. The first block region 18 may include a first upper flat surface 22 and a first lower flat surface 24 formed between substantially parallel opposing first and second side walls 26, 28 and a first end wall 30. Edges of the first and second side walls 26, 28 and a first end wall 30 may abut edges of the corresponding master link first inclined portion 13. While shown in FIGS. 1, 2A and 2B as being substantially rectangular, the first block region 18 may be any shape conforming to a corresponding master link mating surface portion. A second end region 32 of the first inclined portion 12 may include first and second curved portions 34, 36. The curved portions 34, 36 may provide additional frictional contact with the master link mating surface. In some embodiments, a top perimeter region 38 of the first inclined portion 12, where the first upper flat surface 22 meets the opposing side walls and end wall, may be beveled for ease of molding. The first lower flat surface 24 of the first inclined portion 12 may substantially contact a corresponding master link mating surface when the cover 10 is applied over the master link mating surface. To this end, the first lower flat surface 24 may be formed according to the contours of a corresponding master link mating surface.

The cover 10 may also include a second inclined portion 14. The second inclined portion 14 may be formed adjacent to the first inclined portion 12 and may be configured to cover a corresponding master link second inclined portion 15. The second inclined portion 14 may be continuously formed with the first inclined portion 12 and may abut the second end region 32 of the first inclined portion 12. In some embodiments, the second inclined portion 14 may extend substantially away from the first inclined portion 12 at an angle that is less than the angle of incline of the first inclined portion 12. However, the angle of incline may vary as the cover 10 is formed for use with master link portions of varying shapes.

The second inclined portion 14 may include a second upper flat surface 40, first and second opposing downturned sidewalls 41, 42 and an underside portion 44. The second upper flat surface 40 may be formed to cover a surface area at least equal to a surface area formed by the boundaries of a middle section of the master link housing one or more master link teeth. The first and second opposing downturned walls may be side walls extending to cover a portion of a corresponding second inclined master link portion side walls. In such embodiments, the second upper flat surface 40 may effectively terminate at each of the ends of the side walls as a side skirt. In some embodiments, downturned wall perimeter regions 46 of the first and second opposing downturned walls, (e.g., where the second upper flat surface 40 meets the opposing downturned walls and end wall and the side and bottom regions of the opposing downturned walls) may be beveled for ease of molding.

The underside portion 44 of the second inclined portion 14 may be configured for covering or receiving all or a portion of one or more of the corresponding master link teeth. In some aspects, the underside portion 44 may be configured to substantially surround and protectively house the teeth of a corresponding master link teeth shaped region. Thus, the underside portion 44 of the second inclined portion 14 may include a body for accepting the plurality of teeth of a master link. To this end, the underside portion 44 may include an undulating surface, having a plurality of channel shaped undulations 48, 50, 52 including first, second, third and so on undulations corresponding to a number of master link teeth disposed on the master link mating surface. Each channel shaped undulation may be defined by side walls (e.g., side wall 54). Each of the side walls may include an upper cavity surface (e.g., upper cavity surface 56) tapering to a curved bottom cavity surface (e.g., curved bottom cavity surface 58).

In use, the teeth of the corresponding master link mating surface portion may be positioned within the boundaries of the second inclined surface (e.g., between first and second undulating portions). When the teeth are inserted into respective cavities defined by the upper cavity surfaces, the top surface of the tooth may abut against the top surface of a tooth receiving cavity. Thus, the undulations may be of a depth adequate to engage the plurality of teeth in a stable and intimate configuration.

In some embodiments, each cavity may be formed as a transitional bevel adapted to receive and hold each of the plurality of serially aligned teeth in a pinching relationship. As the teeth of the master link are inserted into the underside portion 44 of the teeth receiving portion, the walls of the contact surfaces of the bevel may flex outwards to receive the width of the teeth and then, once the teeth are inserted into respective grooves or undulations, the walls may compress or pinch against the sides of the teeth. Each tooth may be captured within a cavity and releasably secured between the side walls of the channel.

In alternative embodiments, the underside portion 44 may be formed as a plurality of teeth receiving mechanisms formed as integral contact planes in a serial and contiguous relationship. These contact planes may include first, second, third, fourth and fifth, and so on, contact planes each of which is adapted to interface with a portion of the teeth shaped portion of the master link mating surface. Each of the teeth receiving mechanisms may include a first wall and a second wall. The first wall and the second wall may similarly be adapted to flex outwards when one of the plurality of serially aligned teeth is inserted between two contact planes and in consequence hold the cover 10 against movement relative to the master link.

The underside portion 44 of the second inclined portion 14 may also include first and second bolt hole inserts 60, 62 for frictionally coupling with one or more bolt holes (e.g., a bore for accommodating a bolt that couples two half links) of the corresponding master link. The bolt hole inserts may be respectively formed in end regions of the underside portion 44 of the second inclined portion 14. The bolt hole inserts 60, 62 may be formed as circular stumps or nubs configured to slide down into bolt holes. In some instances, bolt holes may vary from one another (e.g., one bolt hole may be a clearance hole and one bolt hole may be a threaded hole) and thus the bolt hole inserts may vary to be insertable into varying types of bolt holes. In use, the bolt hole inserts may frictionally slide into the bolt holes of a corresponding master link to prevent paint or debris from getting into the holes or threads. Upon insertion into the bolt holes, the bolt hole inserts 60, 62 may provide a friction fit for retention of the cover 10 on the master link. In some embodiments, the perimeter regions 63 of the bottom surfaces of the bolt hole inserts 60, 62 may be beveled for ease of molding.

The cover 10 further includes a third inclined portion 16 formed adjacent to the second inclined portion 14 and opposite the first inclined portion 12. The third inclined portion 16 may be configured to cover a corresponding master link third inclined portion 17. The third inclined portion 16 further includes a second block region 64 and a toe portion 66 for fitting around a corner portion of the corresponding master link. The second block region 64 may include a third upper flat surface 68 and a second lower flat 70 surface formed between substantially parallel opposing third and fourth side walls 72, 74. A first end 76 of the second block region 64 may curve downward slightly as it extends away from the second inclined portion 14. Thus, the third inclined portion 16 may extend substantially downward from the second inclined portion 14 at an angle that is more than the angle of incline of the second inclined portion 14. While shown in FIGS. 1, 2A and 2B as being substantially rectangular, the second block region 64 may be any shape conforming to a corresponding master link mating surface portion. The second lower flat surface 70 of the third inclined portion 16 may substantially contact a corresponding master link mating surface when the cover 10 is applied over the master link mating surface. To this end, the second lower flat surface 70 may be formed according to the contours of a corresponding master link mating surface.

The third inclined portion 16 may include a toe portion 66 disposed within a second end region 32. The toe portion 66 may provide a releasable hook-type engagement function with a corresponding corner portion of the master link. The toe portion 66 may be a downturned elongate toe comprising an upper curved region 80 and a lower flat region 82 formed at the distal end of the second block portion and may downwardly depend therefrom. Thus, a lower curvilinear bight 84 may be formed curving downwards and backwards around a corner portion of the master link. Inner surfaces 86, 88 of the toe portion 66 may substantially contact corresponding regions of the master link mating surface. The third and fourth opposing sidewalls may conform in shape to the toe portion 66, forming a lip substantially around the corresponding corner portion of the master link. In some embodiments, the side perimeter regions 78 of the third inclined portion 16 and the toe portion 66, where the third upper flat surface 68 meets the opposing side walls may be beveled for ease of molding.

When cover 10 is coupled to a master link mating surface portion, the lower edges of first inclined portion 12 end wall and side walls are generally adjacent to a corresponding side wall portions of a first inclined portion 13 of a master link. The downturned opposing sidewalls 41, 42 of the second inclined portion 14 may surround the upper portions of corresponding master link second inclined portion 15 side walls and the lower edges of third inclined portion 16 side walls are generally adjacent to a corresponding side wall portions of a corresponding master link third inclined portion 17. Cover 10 may thus master link mating surface in any suitable fashion so that cover 10 sealingly engages the master link mating surface.

In use, the cover 10 may be fitted to a master link by placing the toe portion 66 substantially about a corresponding corner portion of the master link, aligning the coupling inserts with their corresponding bolt holes and applying a substantially downward pressure to achieve direct contact of the remainder of the cover 10 with the master link mating surface. To this end, the distal end of the toe portion 66 may extend around a master link side wall and a predetermined length over a master link underside portion 45. If desired, another toe (not shown) may be provided at the distal end of the first inclined portion 12. Thus, the cover 10 may protect the master link mating surface from damage, rust paint, environmental hazards, etc., by substantially covering the surface. The toe portion 66 may also be utilized to remove the cover 10 from the master link.

Figure 3:
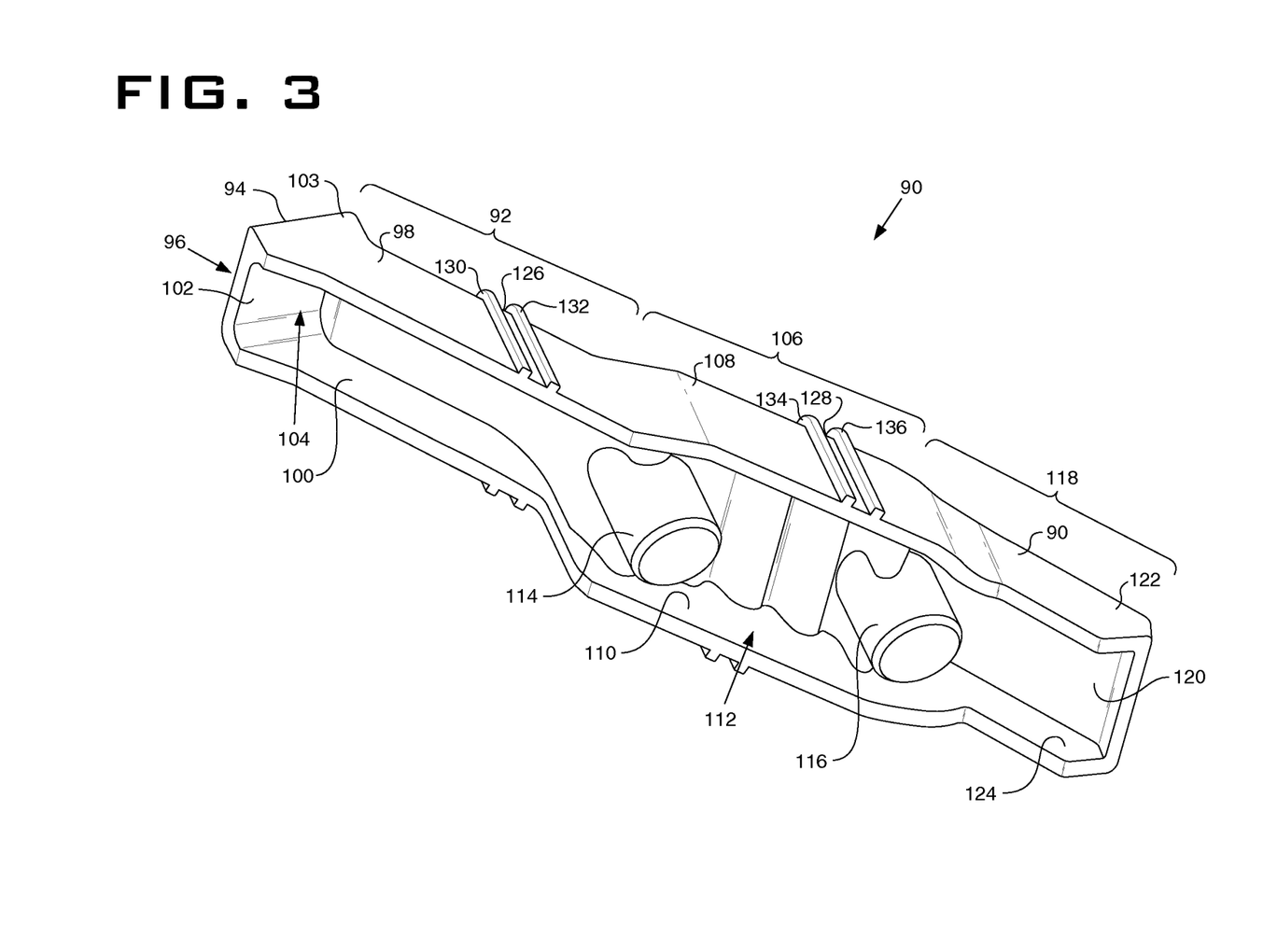
FIG. 3 illustrates an isometric view of an additional embodiment of a master link mating surface cover according to embodiments of the present disclosure.

In some embodiments, as shown in FIG. 3, an alternative master link mating surface cover 90 is provided that includes a first inclined portion 92 further including an upper flat surface 94 terminating at a first distal end of the cover 90 as a first skirt 96. In such embodiments, the first skirt 96 may terminate below a first distal end surface of the master link mating surface, substantially forming a protective periphery about a first distal end of the master link mating surface. The first skirt 96 may include first and second opposing downturned side walls 98, 100 and a downturned end wall 102. The first skirt 96 may surround the peripheral edges of the master link mating surface and extend below the surface to provide substantially complete enclosure of the top portions of the master link mating side surfaces. Side walls 98, 100 and end wall 102 may generally merge with each other or otherwise form corners therebetween. An underside surface 95 of the first inclined portion 92 may substantially contact a corresponding master link mating surface when the cover 90 is applied over the master link mating surface. The first distal end may also include a ridge portion 103. Ridge portion 103 may assist with the application of downward force to couple the cover 90 to a corresponding master link mating surface. The underside surface of the first distal end of the first inclined portion 92 may include an inner cavity 104 formed within an undersurface of the first distal end to substantially conform to a corresponding master link mating surface distal end.

The cover 90 may also include a second inclined portion 106 formed continuously adjacent to the first inclined portion 92 including a second upper flat surface (not shown, but may be substantially similar to second upper flat surface 40 of FIGS. 2A and 2B), third and fourth opposing downturned side walls 108, 110 and an undulating underside portion 112 for receiving a corresponding master link teeth shaped portion. The second inclined portion 106 may extend away from the first inclined portion 92 at an angle that is less than the angle of incline of the first inclined portion 92. The downturned side walls 108, 110 may extend below the top edge of the master link to partially cover the corresponding master link side walls. As similarly described with respect to FIGS. 1, 2A, and 2B, the undulating underside portion 112 of the second inclined portion 106 may be configured to receive corresponding master link teeth disposed within the second inclined portion and may also include first and second bolt hole inserts 114, 116 for frictionally coupling with one or more bolt holes of the corresponding master link. In some embodiments, the perimeter regions 117 of the bottom surfaces of the coupling hole inserts 114, 116 may be beveled for ease of molding.

The cover 90 may further include a third inclined portion 118 formed adjacent to the second inclined portion 106, further including a third upper flat surface (not shown, but may be substantially similar to third upper flat surface 68 of FIGS. 2A and 2B), a second lower flat surface 120 and fifth and sixth opposing downturned side walls 122, 124 that terminate at an edge of the second distal end of the master link mating surface. The third inclined portion 118 may extend substantially away from the second inclined portion at an angle that is more than the angle of incline of the second inclined portion. The downturned side walls 122, 124 may extend below the top edge of the master link to partially cover the corresponding master link side walls. The second lower flat surface 120 of the third inclined portion 118 may substantially contact a corresponding master link mating surface when the cover 90 is applied over the master link mating surface.

In some embodiments, as depicted in FIG. 3, the cover may be designed with an attachment method integrated with a portion of the cover to enable the use of additional fasteners such as tie straps for securing the pieces to respective master link mating surfaces. Attachment method receiving channels (e.g., tie receiving channels 126, 128, as shown in FIG. 3) may be provided. Tie receiving channels 126, 128 may be formed from raised ridges 130, 132, 134, 136 disposed along a top surface of the cover 90.

In further embodiments, the cover may shield multiple or adjoining master links installed on the track link surface. In such embodiments, the cover may consist of two cover pieces.

As described above, a master link mating surface cover may generally include a first inclined portion, a second inclined portion formed adjacent to the first inclined portion, and a third inclined portion formed adjacent to the second inclined portion opposite the first inclined portion. In other words, when looking at the cover from a side perspective, the first inclined portion is formed in a region above the second inclined portion, and the second inclined portion is formed in region above the third inclined portion. The first, second and third inclined surfaces may be inclined at different predetermined angles and may form a substantially s-shaped device for covering a corresponding master link mating surface. The cover may be applied on master link mating surface and may be retained using mating pins and/or a retention toe in order to avoid damage to the link during shipping.

A cover formed according to embodiments of the disclosure may be continuously formed or may be molded using a family of molds with the mold for each portion. The cover may be configured to fit on and/or over a master link mating surface and may cover a single or multiple adjoining master link components. The cover may be formed from a variety of materials. For instance, a cover as described above may be formed from a flexible material, such as a rubber or plastic material, or any material having adequate flex and wear properties to withstand loading from contact with other components of the track assembly. Examples of materials that may be used to form the cover include, but are not limited to plastic, such as polypropylene, polyvinylchloride. The cover may also be formed from any suitable thermoplastic material, e.g., polyurethane or any other rubber-like material that is flexible and durable. Some alternative materials may include neoprene rubber, thermoplastic polyolefins (TPO), thermoplastic elastomers, silicones and polyesters (PE). Other materials may be used, such as medium density closed cell foam. The cover may also be reusable if formed from one of the above materials or from another type of reusable material.

A cover formed according to embodiments of the disclosure may be flexible enough such that, when opposing forces sufficient to overcome longitudinal rigidity of the cover are applied to the opposite edges of the cover, a first end curves upward and releases from the master link mating surface under the effect of a resulting bending force acting in a direction away from the mating surface.

Figure 4:
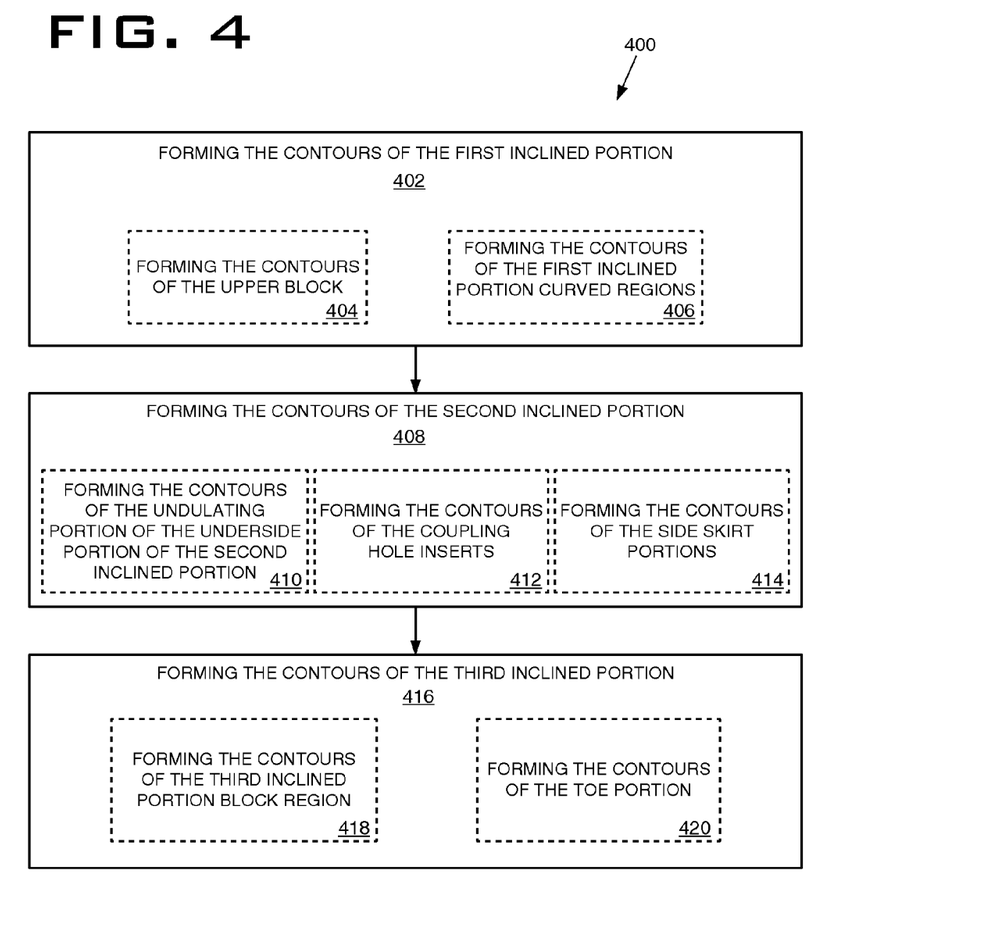
FIG. 4 illustrates a flowchart of method for manufacturing a master link mating surface cover according to embodiments of the present disclosure.

FIG. 4 is a flowchart of a method 400 for forming a master link mating surface cover. It is contemplated that method 400 may be performed in any order suitable for forming a master link mating surface cover according to embodiments of the disclosure. Method 400 may refer to the apparatuses described in FIGS. 1-3. However, it should be apparent that method 400 may be used to form alternative or additional embodiments of a master link mating surface cover. Further, the order of operations of FIG. 4 should not be considered limiting.

Method 400 includes a first inclined forming step 402 in which the contours of the first inclined portion are formed. Step 402 may include upper block forming step 404, where the contours of the upper block are formed and curved region forming step 406, where the contours of the first inclined portion curved regions are formed as described above. Method 400 also includes a second inclined portion forming step 408 in which the contours of the second inclined portion are formed. Step 408 may include an underside contour forming step 410, where the contours of the teeth-shaped or undulating portion of the underside portion of the second inclined portion are formed. Step 408 may include bolt hole insert forming step 412, the contours of the bolt hole inserts are formed as described above. Step 408 may include skirt contour forming step 414, where the contours of side skirt portions of the second inclined portion are formed as described above. Subsequently, the third inclined portion is formed at step 416, where the contours of the third inclined portion are formed as described above. Step 416 may include block forming step 418, where the contours of the third inclined portion block region are formed, and toe forming step 420, where the contours of the toe portion of the third inclined portion are formed as described above. In some embodiments, the first inclined portion, the second inclined portion and the third inclined portion, and the components thereof may be continuously formed as a single device. In other embodiments, the first inclined portions, the second inclined portion and the third inclined portion may be molded separately and joined prior to application to the master link mating surface.

INDUSTRIAL APPLICABILITY

The disclosed master link mating surface covers are applicable to any machine where durability of the master link joint is required. The disclosed master link mating surface cover 10 may improve the durability of master link joint mating surface by providing protection to the mating surface during transportation and storage. By providing a master link mating surface cover 10, improved efficiency when joining master link joints is accomplished, with increased durability and longer operating lives for master link joints, thereby reducing operating costs.

Each master link mating surface cover 10 extends essentially the length of the master link mating surface and includes a first inclined portion 12, a second inclined portion 14 and a third inclined portion 16. The first inclined portion 12 may be configured to substantially contact a top surface of a corresponding first inclined portion of the master link mating surface. Thus, the first inclined portion 12 may slope accordingly to conform to the shape of a corresponding first inclined master link portion. The first inclined portion 12 may further include a first upper flat surface 22 terminating at a first end 76 as an upper block. The upper block may also include first and second opposing side walls and a first end wall 30. A second end of the first inclined portion 12 may include first and second curved portions 34, 36. The curved portions 34 may provide additional frictional contact with the master link mating surface. In some embodiments, a top perimeter region 38 may be beveled for ease of molding.

The cover 10 includes a second inclined portion 14. The second inclined portion 14 may be formed behind the first inclined portion 12. The second inclined portion 14 may be continuously formed with the first inclined portion 12 and may abut a second end of the first inclined portion 12. In some embodiments, the second inclined portion 14 may extend substantially downward from the first inclined portion 12 at an angle that is less than the angle of incline of the first inclined portion 12. The second inclined portion 14 may include a second upper flat surface 40, first and second opposing downturned sidewalls 41, 42 and an underside portion 44. The second upper flat surface 40 may be formed to cover a surface area at least equal to a surface area formed by the boundaries of a middle section of the master link partial unit housing the master link teeth. The first and second downturned walls may be side walls extending to cover a portion of corresponding master link second inclined portion side walls. In such embodiments, the second upper flat surface 40 may effectively terminate at each of the ends of the side walls as a side skirt.

An underside portion 44 of the second inclined portion 14 may be configured to receive a plurality of teeth or serrations provided on a portion of the master link mating surface. The underside portion 44 may include an undulating surface, having first, second, third and so on undulations corresponding to a number of master link teeth. In embodiments, the underside portion 44 may be formed as a plurality of integral contact planes in a serial and contiguous relationship. These contact planes may include first, second, third, fourth and fifth, and so on, contact planes each of which is adapted to interface with a portion of the teeth shaped portion of the master link mating surface. The underside portion 44 may be configured for covering or receiving all or a portion of one or more of the corresponding master link teeth. In some aspects, the undulating underside portion 44 may be configured to substantially surround and protectively house the teeth of a corresponding master link teeth shaped portion. The undulating underside portion 44 of the second inclined portion 14 may also include first and second pin bore inserts for frictionally coupling with one or more bolt holes of the corresponding master link.

The cover 10 further includes a third inclined portion 16 formed behind the second inclined portion 14. The third inclined portion 16 may be configured to cover a third inclined portion 16 of the master link mating surface. The third inclined portion 16 further includes a third upper flat surface 68 and a toe portion 66 for fitting around a corner portion of the corresponding master link and third and fourth opposing sidewalls. The toe portion 66 may provide a releasable hook-type engagement function with a corresponding corner portion of the master link. To this end, the third and fourth opposing sidewalls may conform in shape to the toe portion 66, forming a lip substantially around the corresponding corner portion of the master link.

The embodiments of the present disclosure may be applied to various applications While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A master link mating surface cover assembly comprising:
    a first inclined portion including a first upper flat surface terminating at a first distal end of the cover as a block, wherein the first inclined portion substantially covers a corresponding first inclined region of a master link mating surface;
    a second inclined portion formed behind the first inclined portion including a second upper flat surface and an underside for receiving a corresponding master link teeth shaped portion, wherein the underside portion includes first and second bolt hole inserts for frictionally coupling with one or more bolt holes of the corresponding master link; and
    a third inclined portion formed behind the second inclined portion, including a third upper flat surface a toe portion for fitting around a corner portion of the corresponding master link.

2. The assembly of claim 1, wherein the first inclined portion further includes first and second curved portions providing additional frictional contact with the corresponding master link mating surface.

3. The assembly of claim 1, wherein the second inclined portion extends substantially downward from the first inclined portion at an angle that is less than an angle of incline of the first inclined portion.

4. The assembly of claim 1, wherein the underside portion is formed as an undulating surface.

5. The assembly of claim 4, wherein the undulating surface includes a plurality of undulations corresponding to a number of master link teeth disposed on the corresponding master link mating surface.

6. The assembly of claim 5, wherein each of the plurality of undulations are defined by side walls, wherein each of the side walls includes an upper cavity surface tapering to a curved bottom cavity surface.

7. The assembly of claim 5, wherein the plurality of undulations are configured to substantially hold corresponding master link teeth immobile.

8. The assembly of claim 1, wherein the third inclined portion extends substantially downward from the second inclined portion at an angle that is more than an angle of incline of the second inclined portion.

9. The assembly of claim 1, wherein the toe portion comprises a downturned elongate toe including an upper curved region and a lower flat region formed at a distal end of a second block portion of the third inclined portion and downwardly depends therefrom.

10. The assembly of claim 1, wherein the toe portion comprises inner surfaces that substantially contact corresponding regions of a master link.

11. The assembly of claim 1, wherein the assembly is formed from at least one of polypropylene, polyvinylchloride, polyurethane, neoprene rubber, silicone, a thermoplastic polyolefin, and a thermoplastic elastomer.

12. A method for manufacturing a master link mating surface cover assembly comprising:
    forming a first inclined portion, further including forming an upper block portion and forming first inclined portion curved regions;

forming a second inclined portion further including:
  forming an underside contour region, wherein contours of an undulating underside portion are formed;
  forming one or more bolt hole inserts;
  forming two or more side skirt portions of the second inclined portion
  forming a third inclined portion, including forming a third inclined portion block region and forming a toe portion of the third inclined portion.

13. The method of claim 12, wherein the first inclined portion, the second inclined portion and the third inclined portion may be continuously formed using a single mold.

* * * * *